May 10, 1949.    W. C. MARKEY    2,469,567
STEAM CARGO HOIST

Filed Nov. 8, 1944

INVENTOR.
William C. Markey
BY
Reynolds Beach
ATTORNEYS

Patented May 10, 1949

2,469,567

UNITED STATES PATENT OFFICE 2,469,567

STEAM CARGO HOIST

William C. Markey, Seattle, Wash.

Application November 8, 1944, Serial No. 562,459

5 Claims. (Cl. 254—150)

The present invention relates to steam cargo hoists of the general nature disclosed in the patent to Cunningham No. 1,906,947, issued May 2, 1933.

As in that patent, it is a primary object to provide a steam cargo hoist which is quiet in operation, in which vibration and wear are reduced to a minimum, in which the efficiency and durability of the hoist, and particularly its durability and reliability under all kinds of weather and climatic conditions, are greatly increased, and a steam cargo hoist in which all parts are well lubricated by and during the normal operation of the hoist, and in which the lubricated parts are protected from the weather, notwithstanding the exposed locations where such hoists are installed.

It was found in the manufacture and use of the Cunningham hoist that it was considerably less noisy and less subject to vibration and wear than prior hoists. However, it was found that it did not wholly and completely solve the problem, and that there were other problems, not touched upon in the Cunningham patent, which still remained to be solved. For instance, such a hoist, mounted aboard a vessel, is inevitably exposed to severe conditions of sea, of weather, and of climate, all of which affect its wear, but more particularly it is difficult to effect and maintain proper lubrication of such a hoist, and this difficulty of lubrication reflects back in added wear, vibration, and resultant increase in noise.

In attempting to solve these additional problems I discovered that the primary cause lay in the difficulty of securing and maintaining adequate lubrication, because in the Cunningham hoist there were numerous working parts still exposed, and these were subject to the weather and to the variations in lubricating conditions already mentioned, with the resultant increases in vibration, in wear, and in noise.

Accordingly it is an object of the present invention to further advance the primary object of the Cunningham invention by an arrangement which simplifies the lubrication of all working parts, which protects parts so lubricated, and the lubricant itself, against weather, sea, and to a certain extent climatic conditions, and which thereby lessens the wear and vibration, and decreases the noise, not only at the outset but throughout the life of the hoist.

A further advantage is found to flow from the above, namely, the journaling and lubrication of the main shaft and drive shaft are materially simplified, and the entire construction may be made more rugged by reason of the construction adopted, notwithstanding the simplicity thereof, the attainment of which simplicity is in itself an object.

These objects, and others as will appear hereafter, are attained by the mechanism illustrated in the accompanying drawings, wherein is disclosed a preferred form of my invention.

Figure 1:
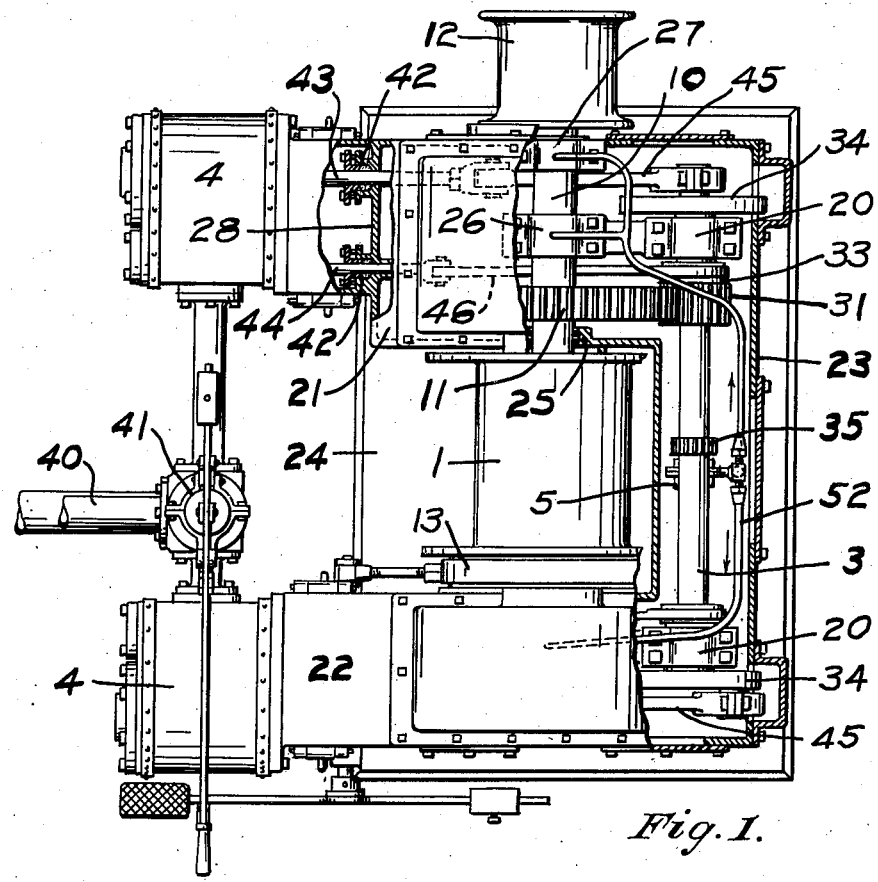
Figure 1 is a top plan view, with parts broken away and shown in section, illustrating such a steam cargo hoist according to my invention.

The drum 1 is carried by a main or driven shaft 10, on which shaft are also secured the driven gear 11 and, preferably, a gypsy head 12. Brake mechanism 13 may also be associated with the drum 1. This driven shaft, with the elements mentioned, is supported in a main frame, which is generally of U shape in plan, as best seen in Figure 1. This main frame consists of the legs 21 and 22, and the end or bottom 23 which connects the two legs of the U. All this may be supported suitably upon a base 24, but the U-shaped frame described is, according to my invention, made hollow, that is, each leg 21 and 22 is hollow, and the bottom 23 is hollow, the whole forming a hollow U-shaped element which constitutes or includes, particularly in the bottom 23, an oil sump, in the preferred embodiment.

This frame journals the main shaft 10, as indicated at 26 and 27, in connection with the hollow leg 21. Similar bearings would be formed within the hollow leg 22. These bearings, it will be observed, are all substantially within the hollow portion of the frame. At 25 the main shaft is packed against ingress of water, or egress of lubricant. This might, if desired, constitute a further shaft bearing. The gypsy head 12 is afforded adequate close-up support by the bearing 27.

Journaled at 20 within the hollow bottom of the U is a driving shaft 3. This shaft carries a driving gear 31 meshing with the driven gear 11 on the drum shaft. The gear ratio and design may correspond to the teaching of the Cunningham patent. The drum shaft 10 carries also certain driving connections, to be described shortly in detail, whereby the shaft 3 is driven from the steam engine means provided.

There may be one, but preferably there are two such steam engines 4, mounted externally of and in prolongation of the hollow legs of the U-shaped frame. Preferably these are reciprocating steam engines, as this type has been found most suitable for use in steam cargo hoists. Steam is supplied through a lead 40, past a valve 41, and each steam engine drives through a piston rod 43, and has also a valve rod 44. These reciprocating rods extend through the adjacent closed ends 28 of the main frame, being packed therein as indicated at 42. Within the hollow leg of the main frame each piston rod 43 is connected by a connecting rod 45 to a crank disk 34 upon the drive shaft 3, and each valve rod 44 is connected by an eccentric rod 46 to an eccentric 33 upon the drive shaft 3. These rods 45 and 46 are contained wholly within the hollow frame, and may, indeed, be so arranged as to be lubricated more or less directly by splash from the oil within the oil sump.

Figure 2:
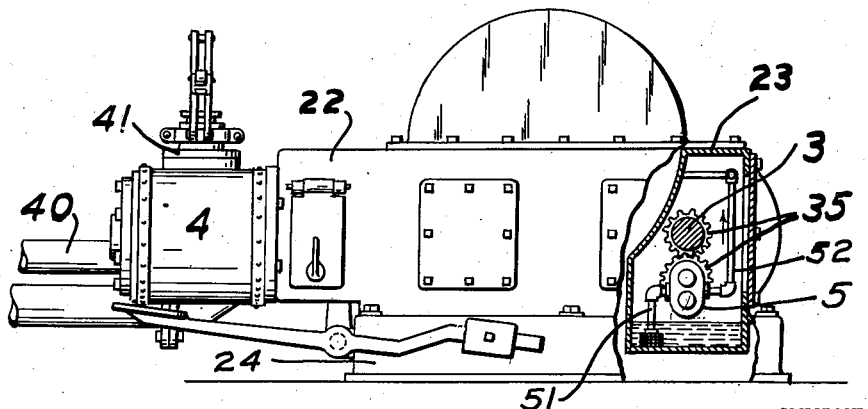
Figure 2 is an end elevation, with parts broken away and shown in section, of the same hoist.

The oil sump is shown in preferred form in Figure 2. Some portions of the mechanism cannot well be lubricated by splash from the oil sump, more particularly the bearings, such as 26 and 27. I provide simple means, wholly contained within the hollow frame, for accomplishing such lubrication.

Thus, for example, a pump 5 driven from the driving shaft 3 by gear means indicated at 35, receives oil by way of an intake 51 dipping within the sump, and delivers the oil by oil conduit means 52 to such selected points of the mechanism as require such lubrication.

As will be observed, all working parts, with the sole exception of the drum 1, the gypsy head 12, and the brake 13, are encased within the hollow frame. There they are supplied with lubricant, and the lubricant and all lubricated parts are completely and thoroughly protected from the weather. In addition, because of the complete encasement of all working parts, the hoist is not only quiet to the maximum degree when new, but because the construction is conducive to lessening the wear, by better lubrication, by better support, and by protection from the elements, it continues to be noisy to a minimum degree. It is in fact substantially noiseless, with all the advantages of the Cunningham hoist.

I claim as my invention:

1. A relatively noiseless steam cargo hoist comprising: a drum shaft and a drum and driven gear thereon; a hollow main frame of U-shape in plan formed with an oil sump and with bearings for said shaft in the opposite legs, with the drum received between the legs and the driven gear received within the hollow of one leg; steam engine means mounted in prolongation of at least one such leg; a drive shaft carrying a driving gear meshing with said driven gear, and located and journaled wholly within the hollow end of the U; and driving connections between said steam engine means and said drive shaft, extending through and encased within such leg of the U as supports the steam engine means, said driving connections including a member repeatedly dipping into the oil sump.

2. A relatively noiseless steam cargo hoist comprising: a drum shaft and a drum and driven gear thereon; a hollow main frame of U-shape in plan formed with an oil sump and with bearings for said shaft in the opposite legs, with the drum received between the legs and the driven gear received within the hollow of one leg; two reciprocating steam engines mounted externally and in prolongation of the respective legs; a drive shaft carrying a driving gear meshing with said driven gear, said driving shaft being disposed and journaled wholly within the hollow end of the U; and driving connections, including a connecting rod, extending through each leg between its steam engine and the opposite ends of the drive shaft, and dipping into the oil sump.

3. A relatively noiseless steam cargo hoist comprising a drum shaft and a drum and driven gear thereon; a hollow main frame including an oil sump, of U-shape in plan, formed with bearings in the opposite legs for said shaft, whereby to support the drum between the legs and the driven gear within the hollow of one leg; a drive shaft carrying a driving gear meshing with said driven gear, and journaled within the hollow end of the U; steam engine means externally mounted in prolongation of at least one leg of the U; driving connections extending through the hollow frame between such steam engine means and the drive shaft; an oil pump supported within and receiving oil from said oil sump, and driven from said drive shaft; and oil conduit means extending from said oil pump, within the hollow frame, to selected points therein requiring lubrication.

4. A relatively noiseless steam cargo hoist, comprising: a drum shaft and a drum and driven gear thereon; a hollow main frame including an oil sump of U-shape in plan, formed with bearings in the opposite legs for said shaft, whereby to support the drum between the legs and the driven gear within the hollow of one leg; a drive shaft carrying eccentrics and a driving gear, located and journaled wholly interiorly of the hollow end of the U to mesh the driving and driven gears; two reciprocating steam engines mounted externally and in prolongation of the respective legs; and driving connections, including glanded piston and valve rods extending within the respective legs, and connecting rods and eccentric rods extending through the hollow legs, and dipping within the oil sump, to operative connections with the drive shaft.

5. A relatively noiseless steam cargo hoist, comprising: a drum shaft and a drum and driven gear thereon; a hollow main frame including an oil sump, of U-shape in plan, formed with bearings in the opposite legs for said shaft, whereby to support the drum between the legs and the driven gear within the hollow of one leg and dipping within the oil sump; a drive shaft carrying eccentrics and a driving gear, and journaled within the hollow end of the U to mesh the driving and driven gears; two reciprocating steam engines mounted externally and in prolongation of the respective legs; and driving connections, including glanded piston and valve rods extending within the respective legs, and connecting rods and eccentric rods extending through the hollow legs to operative connections with the drive shaft; an oil pump mounted within and receiving oil from the oil sump, and driven from the drive shaft; and oil conduit means extending from said oil pump, within the hollow frame, to selected points therein requiring lubrication.

WILLIAM C. MARKEY.

REFERENCES CITED

The following references are of record in the file of this patent:

UNITED STATES PATENTS

| Number | Name | Date |
| --- | --- | --- |
| Re. 10,586 | Westinghouse | Apr. 21, 1885 |
| 699,688 | Lane | May 13, 1902 |
| 1,850,976 | Greve | Mar. 22, 1932 |
| 1,906,947 | Cunningham | May 2, 1933 |
| 2,344,681 | Deschner | Mar. 21, 1944 |

FOREIGN PATENTS

| Number | Country | Date |
| --- | --- | --- |
| 188,968 | Great Britain | Nov. 23, 1922 |
| 620,026 | Germany | Oct. 11, 1935 |